Patented July 29, 1952

2,605,184

UNITED STATES PATENT OFFICE 2,605,184

FISH PRODUCT AND METHOD OF FORMING SAME

Alan Osbourne, Cabin John, Md.

No Drawing. Application March 25, 1952, Serial No. 278,510

11 Claims. (Cl. 99—111)

The present invention relates to fish and a method of treating the same to remove odors and typically fish taste and to impart thereto a desirably improved taste such as a meat taste.

The primary object of the present invention is to treat various types of fish, including shellfish, to remove therefrom typical taste imparting components such as the natural fish juices and oils of which the oil contains most of the typical fish tasting components and to return to the fish an oil which is more saturated in hydrogen than the unsaturated oils removed.

Another object is to convert the fish oils or both the fish oils and juices to desirably tasting materials and to return them to the fish product.

It is a further object to give to the fish, or retain for the fish, a desirable meaty taste by first removing the fish tasting components from the body of the fish and returning thereto a meat tasting component.

It is a further object to give fish a meaty taste without the use of natural meat components.

It is a further object to convert unstable fish taste imparting oils of fish to more stable oils and return the same to the fish body. In this way, semi-edible fish such as menhaden, and full grown pilchard, which have a low sales price due to the strong oils can be sold for a good price.

According to the preferred practice of the present invention, raw fish are first cooked either completely or partly to free the same entirely or substantially entirely from its unstable oils and taste imparting juices. After the juices and oils are removed from the fish, they may be separated from each other. Thereafter, preferably, the oil is treated to at least partially saturate the same by hydrogenation and the oil and fat are then returned to the fish body. The juices containing gelatinous materials may be discarded, but the juices may be purified by filtration by absorption to remove taste imparting components and returned to the fish together with the oil if desired. The deodorized and tasteless oil and juices may be separately readded to the fish, or they may be emulsified one with the other and returned to the fish in such manner, together with desirable meaty taste imparting components with or without other flavoring or seasoning materials as may be desired. The final product as described may be hermetically sealed in cans, metal tubes, or other containers, or may be dried and/or smoked, or mixed to a paste or spread to a final palatable product and stored as such. The lower grade material can be prepared as an animal food such as chicken feed, that will not give the chicken flesh a fishy taste.

Following the preferred practice of the present invention, the fish, whole, suitably divided, or ground up, is cooked for a short period of time as by boiling in water, or by steaming, baking or stewing for a period at least sufficient to soften the fish meat and release all or a substantial portion of the juices and oils. Such cooking period may range from 15 minutes to 1½ hours, depending upon the type of fish, i. e., the quantity of fat contained therein, and the temperature of cooking which may be at the boiling point of water, where the fish is boiled in water at atmospheric pressure, or at higher temperatures when the fish is cooked by steam with pressure ranging up to 400° F. Somewhat lower temperatures will be useful beginning about 75° C. where less than atmospheric pressure conditions are used.

After cooking, the fish is separated from the juices by extraction, pressing or centrifuging, preferably by centrifuging, and in this operation the fatty materials and oils may be separated from the aqueous juices as part of the same operation or the juices and fats may be separated in a subsequent step.

Alternatively, the cooked and finely divided fish may then be dehydrated in the air or in vacuum and then the fish oil be extracted with solvents such as petroleum ether, or noninflammable solvents. The fish are then heated to drive off all trace of the solvents.

The fat and oil is preferably then directly, or after first filtering through absorbents, hydrogenated under pressure, for example, about 100 atmospheres in the presence of a nickel, or other typical hydrogenation catalyst to effect substantial, if not complete, saturation of the fat. While complete saturation with hydrogen may be effected, it is unnecessary to saturate the fatty oils beyond that necessary to remove by saturation the most highly unsaturated components such as the drying and semi-drying components of the oil. The hydrogenated product as such, with or without further additions of seasoning materials and vitamins, may then be blended with a meaty tasting component such as the proteinaceous extract of soybean or sodium glutamate, or both.

In an alternative, but less economic procedure, the fish after having its highly unsaturated taste imparting oils withdrawn may have added thereto oils from other sources more saturated than the fish oils which are chemically equivalent to hydrogenated or partially hydrogenated fish oils. Thus such unsaturated oils as corn oil, peanut oil, olive oil, cotton seed oil, or blends thereof may be added to the fish base from which all fish tasting components have been withdrawn.

It will be understood that these preferred taste imparting materials are not meat products, but are generally remotely derived and merely taste like meat since true meat derivatives are sometimes objectionable; however, where meat is not actually objectionable, a true meat extract may be used to supply the meaty taste. The oil and meat tasting component, together with seasoning, is then added in a fluid state to the fish.

As noted above, the aqueous juices which contain little of the fish taste component may be admixed by emulsification with the hydrogenated oil and the meat tasting component and seasoning prior to adding the same to the fish base. However, the aqueous juices may be omitted. When the juices are used, the same may be purified as by filtration prior to admixing the same with the hydrogenated oil. In another alternative, a synthetic aqueous juice may be formed by blending gelatin, water and seasoning salts which product is then blended with the hydrogenated oil and the blends finally returned to the fish base. If desired, a coloring material may be blended with the refined oil, juices or both to give the final fish product an attractive appearance.

Example 1

Clean pilchard, which may be deboned and ground into paste, is boiled at atmospheric pressure for 45 minutes in an approximately equal volume of water. Thereafter, the fish is placed in a centrifuge and centrifuged until all empirically free juices and oils are removed to obtain separately the fish, oils and juices. The oil is placed in a pressure container typically used for hydrogenation and shaken or otherwise agitated for 2 hours with hydrogen under pressure of 50 atmospheres in the presence of finely divided reduced nickel. The oil is then blended with proteinaceous soybean extract to impart thereto a meaty taste and is then readded in a fluid state to the previously centrifuged fish base, the fish and oil is then hermetically sealed in cans or jars. In this example, the hydrogenation may be effected by other typical hydrogenation processes. If desired, the final product may be further dried and packaged with hermetic sealing. The final product may also be dried and packaged or smoked and packaged without hermetic sealing. Other types of fish, which may be in a form other than paste, such as fillets, may be similarly treated.

Example 2

The aqueous juices obtained according to the procedure of the first example is concentrated to about 50% of its normal volume and the product thereof is emulsified with the hydrogenated oil and the meaty tasting component, and the mixture is then readded to the fish base as described in Example 1. In this example sodium glutamate may be added to the juice concentrate prior to emulsifying with the hydrogenated oil in which case the meat taste imparting substance of the first example may be omitted. In either of Example 1 or 2, further addition of vegetable coloring may be made to the fish product or to the oils or juices before or after blending. It will be understood that in either of the examples the oil or juices may be filtered through an absorbent such as diatomaceous earth or charcoal, etc., prior to or after concentrating or hydrogenating.

Example 3

An aqueous juice component may be formulated by blending gelatin with water, seasoning and sodium glutamate to obtain a product which will set to a fairly weak gel, such product is then emulsified with the hydrogenated oil of Example 1.

Example 4

Fish, after removal of all of the natural oil leaving the fish tasting components as described in Example 1, has added thereto 5% by weight of olive oil.

Example 5

Fish are treated as in Example 1 to remove the fish tasting oils and juices and has returned thereto 5% by weight of a mixture of cotton seed oil blended with 5% of a juice containing a small quantity of sodium glutamate sufficient to flavor.

Various modifications of the present invention will occur to those skilled in the art, and it is intended that the disclosure herein given be regarded as merely exemplary and not limiting since various fish products may be treated by the present method, seasoned by various methods and seasoning agents and stored and marketed with or without further addition of stabilizers, antioxidants, preservatives, etc. It is accordingly intended that the invention be interpreted as broadly as defined in the claims. This application is a continuation in part of my co-pending application No. 85,059, now abandoned.

I claim:
1. A fish product formed by removing the taste imparting fats and oils from the fish, hydrogenating the oils and fats removed from the fish to a degree sufficient to destroy taste imparting components and homogeneously reblending the taste free oils and fats thus treated with the fish to form a tasteless fish base and finally adding a desirable flavoring thereto.
2. The fish product defined in claim 1 wherein the flavoring is sodium glutamate.
3. The product is defined in claim 1 which has been hermetically sealed in containers.
4. The product as defined in claim 1 which has been comminuted to a fish paste.
5. The product as defined in claim 1 which has been further smoked and dried.
6. Method of removing the taste and odor normally associated with fish comprising removing from the fish all of the normal oils, fats and juices, associated with the fish hydrogenating the oils and fats, adding a meat flavoring component to said oils and fats and returning the same to the fish base.
7. Method of removing the taste and odor normally associated with fish comprising removing from the fish the normal oils, fats and juices, associated with the fish, at least partly hydrogenating the oil and fat to remove the highly unsaturated components thereof, reblending the hydrogenated oil and the juices, adding thereto a desirably tasting component other than fish and readding the blend to the fish base.
8. Method as defined in claim 7 wherein the flavoring component is a meat tasting proteinaceous soybean extract.
9. Method as defined in claim 7 wherein the flavoring component is meat tasting sodium glutamate.
10. Method of treating fish comprising heating the fish to free oils and juices from the fish meat, centrifuging the oils and juices from the meat, hydrogenating the oils to remove the fish tasting components, adding to the hydrogenated oil a meat tasting component and reblending the same with the fish base.

11. Method of treating fish comprising cooking the fish to free the oils from the fish meat, centrifuging the fish to remove all of the oils therefrom and then adding to the fish an oil more saturated than the oil removed from the fish, said oil having a desirable taste and odor other than fish.

ALAN OSBOURNE.

REFERENCES CITED

The following references are of record in the file of this patent:

UNITED STATES PATENTS

| Number | Name | Date |
|---|---|---|
| 1,143,087 | Stafford | June 15, 1915 |
| 1,489,940 | Hiller | Apr. 8, 1924 |
| 2,055,230 | David | Sept. 22, 1936 |
| 2,088,831 | Ash et al. | Aug. 3, 1937 |
| 2,455,508 | Lilly | Dec. 7, 1948 |

OTHER REFERENCES

"Food Packer," July 1948, page 30, article entitled "Monosodium Glutamate."